_United States Patent Office_

3,576,772
Patented Apr. 27, 1971

3,576,772
CELLULOSE ESTER-ALLYL ETHER CONTAINING POLYESTER VARNISH SOLUTIONS
Karl Raichle and Wolfgang Deninger, Krefeld-Bockum, Bernhard Hess, Krefeld, and Hermann Schnell, Krefeld-Uerdingen, Germany, assignors to Farbenfabriken Bayer Aktiengesellschaft, Leverkusen, Germany
No Drawing. Filed Mar. 12, 1968, Ser. No. 712,395
Claims priority, application Germany, Mar. 30, 1967, F 51,975
Int. Cl. C08b *21/08;* C08g *39/10*
U.S. Cl. 260—16         14 Claims

ABSTRACT OF THE DISCLOSURE

Varnish solutions based on ethylene dicarboxylic acid polyesters having a content of allyl ether compounds together with a cellulose ester in which at least 50% of the esterifiable hydroxyl groups are esterified with aliphatic carboxylic acids containing at least three carbon atoms or a cellulose mixed ester in which at least 40% of the esterifiable hydroxyl groups are esterified with said aliphatic carboxylic acids and at least 10% of the hydroxyl groups thereof are esterified with acetic acid, said varnish solution dust-drying at room temperature in a relatively short time.

---

The present invention relates to polyester varnish solutions with improved properties, especially a higher drying velocity in air.

It is known that varnish solutions based on ethylene-dicarboxylic acid polyesters and having a content of allyl ether compounds which may be present in the varnish solutions as mixing components, but preferably are chemically incorporated in the ethylene-dicarboxylic acid polyesters, dry or harden tack-free not only in deeper layers, but—in contrast to corresponding varnish solutions which do not contain allyl ether compounds—also on the surfaces which are in contact with air. Films obtained from solutions of unsaturated polyesters with a high content of ethylene-dicarboxylic acid and allyl ether radicals in styrene and with an addition of, for example, a ketone hydroperoxide catalyst and a cobalt accelerator are dust-dry at room temperature already after two to three hours, and completely cured, largely scratch resistant, polishable and no longer susceptible to attack by solvents after about 24 hours.

By contrast, the new varnish solutions according to the invention yield films which are also completely hardenable, largely scratch resistant and polishable and are not attacked by solvents, but are dust-dry within a substantially shorted period of time; this constitutes a further substantial advance for the mechanical processing of the varnish solutions on the assembly line.

The object of the invention comprises varnish solutions based on ethylene-dicarboxylic acid polyesters and having a content of allyl ether compounds which may be present in the varnish solutions as mixing components, but preferably are chemically incorporated in the ethylene-dicarboxylic acid polyesters, said solutions containing at least about 0.2 g. mole ethylene-dicarboxylic acid radicals and at least about 0.1 g. mole allyl ether radicals per 100 g. of vehicle in all, to which siccatives and/or peroxide catalysts may be added before working up, and further containing from about 9 to about 100, preferably from about 15 to about 50, percent by weight, referred to the total of polyester and allyl ether compounds, of cellulose esters, where at least 50% of the esterifiable hydroxyl groups of the cellulose are esterified with aliphatic carboxylic acids with at least three carbon atoms, or of cellulose mixed esters where at least 40% of the esterifiable hydroxyl groups of the cellulose are esterified with aliphatic carboxylic acids with at least three carbon atoms and at least 10% of these hydroxyl groups are esterified with acetic acid.

It is known (cm. e.g. "American Paint Journal," vol. 45 (1961) No. 28, pages 70 to 78), to admix ethylene-dicarboxylic acid polyesters in styrene, which are free from allyl ether compounds, with up to 4 percent by weight of cellulose esters or mixed esters of the aforesaid type, whereby the viscosity of the solutions is increased, the fluidity is reduced and the air-drying thereof as well as the surface of films prepared therefrom is improved (see also published German specification No. 1,021,108). As, for example, J. Schreiber explains in "Chemie und Technologie der künstlichen Harze," 2nd edition (1961), vol. I, p. 592, various organic substances may be soluble in the polyester solutions, but unless the substances are copolymerisable, they become incompatible with the solutions (e.g. waxes and paraffins) and are exuded sooner or later; the added cellulose esters are thus likewise exuded during the hardening of the aforesaid polyester solutions. As a result, the films harden or dry on the surface, but they remain sensitive to solvents, even at the bottom side; this can easily be ascertained by peeling the films off from the substrate and subjecting the bottom side thus liberated to the action of a suitable solvent to which the bottom side of a control film which is free from cellulose esters is stable.

Surprisingly, the aforesaid cellulose esters are compatible not only with the solutions of ethylene-dicarboxylic acid polyesters and allyl ether compounds but also with the cured films, although they do not belong to the substances which can be expected to be copolymerised. It appears that the allyl ether compounds have a solubilizing effect on the cellulose esters in the polymerisation products.

Ethylene-dicarboxylic acid polyesters are, as usual, those which are formed by polycondensation of $\alpha,\beta$-ethylenically unsaturated dicarboxylic acids, such as maleic acid, fumaric acid, mesaconic acid, itaconic acid, citraconic acid, dimeric methacrylic acid and the like or of their esters and anhydrides or mixtures thereof, with optionally unsaturated polyhydric alcohols, such as ethylene glycol, propane-diol-1,2, butanediol-1,4 butene(2)diol-1,4, hexanediol-1,6, diethylene glycol, polyalkylene glycol ethers, bis-$\beta$-hydroxyalkyl ethers of aromatic dihydroxy compounds, e.g. 2,2-bis-(4-$\beta$-hydroxy-alkoxyphenyl) - alkanes and -cycloalkanes, xylylene glycols, 1,3-dimethylol-cyclobutane, quinitol and 2,2-bis-(hydroxy-cyclohexyl)-alkanes and -cyclo-alkanes, optionally with the addition of other dicarboxylic acids, such as o-phthalic acid, isophthalic acid, terephthalic acid, tetrahydrophthalic acid, hexahydrophthalic acid, tetrachlorophthalic acid, endomethylene-tetrahydrophthalic acid, hexachloro - endomethylene - tetrahydrophthalic acid, succinic acid, glutaric acid, adipic acid and pimelic acid, or of monocarboxylic acids, such as acrylic acid and methacrylic acid, or of other mono- or polyhydric alcohols, such as glycerol, trimethylolethane, pentaerythritol, allyl alcohols, and partial ethers of monohydric and polyhydric alcohols (cf. e.g. the book by I. Jörksten et al., "Polyesters and Their Application," Reinhold Publishing Corporation, New York, 1956).

For reasons of viscosity it is expedient to use polyesters of the lowest possible viscosity, which ensure a satisfactory quality of the film. Moreover, the polyesters should have a sufficiently high hydroxyl number whereby the viscosity of the mixtures with cellulose esters is strongly reduced. Advantageous values are hydroxyl numbers between about 45 and about 80, preferably of about 70, acid numbers below 30, and viscosities of 16 to 20 seconds according to 4 DIN 43,211 (50% in styrene).

Allyl ether compounds which can be admixed with the solutions and/or can be chemically incorporated in the polyesters are, for example: β,γ-unsaturated alkyl ethers, such as allyl, methallyl, ethallyl, chloroallyl, and crotyl ethers of polyhydric alcohols, such as glycerol, trimethylolpropane, pentaerythritol, sorbitol, starch, saccharose, polyvinyl alcohol, as well as hydroxyl group-containing copolymers or low molecular esters of allyl ether alcohols with mono- or polycarboxylic acids, further methylol compounds etherified with β,γ-unsaturated alcohols, which are derived from urea or melamine, such as methylol-glyoxalureines or methylol-melamine allyl ethers.

Suitable cellulose esters are, in particular, cellulose propionates and cellulose butyrates as well as cellulose-aceto-propionates and cellulose-acetobutyrates, in which at least half of the esterifiable hydroxyl groups of the cellulose are esterified with propionic acid or butyric acid. Particularly suitable are cellulose-acetobutyrates with about 17 to 21 percent by weight acetic acid radicals and about 45 to 50 percent by weight butyric acid radicals of medium viscosity, where medium viscosity means a viscosity yielding 0.4–2 seconds according to ASTM–D–871 Formula B, while a lower or higher viscosity means a viscosity of a lower or higher value.

Suitable solvents for the varnish solutions are: inert solvents, such as xylene, toluene, benzene, ethyl acetate and, optionally, viscosity reducers such as methanol, isopropanol, trimethylol-propane monoallyl ether, β-hydroxyethyl methacrylate, dimethyl formamide, dimethyl sulphoxide or ethers of glycol, such as ethylene glycol monobutyl ether, and copolymerisable vinyl compounds such as styrene, nuclear-substituted styrenes, divinyl benzene, acrylic, methacrylic or crotonic acid esters or amides, esters of vinyl or allyl alcohol, and vinyl ketones.

Since the stability of the films to solvents depends upon the content of allyl ether and ethylene dicarboxylic acid radicals in the varnish solutions, their content should not be less than 0.2 g. mole ethylene dicarboxylic acid ester radicals and 0.1 g. mole allyl ether radicals per 100 g. of polyester+allyl ether compounds+cellulose ester; if volatile allyl ether compounds are used, a higher content of allyl ether may be necessary.

Incorporation of the cellulose esters can be carried out by dissolving the cellulose ester in the solvent, for example, styrene or toluene, optionally with the addition of some alcohol, and expediently with slight heating, and stirring the polyester and possibly the allyl ether compound into this solution. It is also possible to prepare first a solution of the polyester and possibly of the allyl ether compound in the solvent and to dissolve the cellulose ester in this solution, or to dissolve the cellulose ester and possibly the allyl ether compound as gently as possible in the melt of the polyester and subsequently to add the solvent. Care should be taken with all methods to avoid decomposition reactions of the cellulose ester.

The higher the viscosity of the cellulose ester and the more of this ester is added, the shorter is the dust-drying time of the films and the higher is the viscosity of the varnish solution. An insufficient content of allyl ether and ethylenedicarboxylic acid radicals and an excessive content of cellulose ester may render the films sensitive to solvents. A good compromise can be achieved by incorporating a medium molecular cellulose ester with, for example, an unsaturated polyester containing allyl ether radicals in a proportion of 1:5. Similar results can be obtained by using correspondingly larger or smaller amounts of a cellulose ester of a low molecular or high molecular type or mixtures of both.

When polar vinyl monomers are used, there are obtained clear films of unlimited thickness and clear block polymers. Varnish solutions which are free from vinyl monomers and contain for example, toluene or xylene as solvents and optionally alcohol additives, exhibit the same properties. Also with these solutions it is possible to produce films with very brief dust-drying times, which are clear, irrespective of the layer thickness, and stable to solvents.

Besides the reduced dust-drying time and possibly the omission of vinyl monomers, a further important advantage to the user consists in that the vinyl monomer-containing as well as the vinyl monomer-free solutions require, for hardening, only a siccativation with soluble metal compounds, such as cobalt naphthenate or vanadium siccative, but no peroxide, i.e. when thin films of up to about 100μ are to be produced. The addition of a peroxide catalyst is only necessary for the production of thicker film layers. If drying is carried out at an elevated temperature, for example, at 80–100° C., the varnish films dry without any additive.

The varnish solutions according to the invention are suitable for application as clear varnishes, but they can also be pigmented or mixed with dulling agents, whereby dull varnishes or varnishes with a satin finish can be obtained.

EXAMPLES

For the following examples there are used the unsaturated polyesters PE 1 to PE 4 containing allyl ether radicals and the control polyester PE 5, which are listed in the following Table I and the composition of which is given in parts by weight. They were prepared in known manner by melt condensation.

TABLE I

| Composition | PE 1 | PE 2 | PE 3 | PE 4 | PE 5 |
|---|---|---|---|---|---|
| Maleic acid anhydride | 392 | 392 | 392 | 392 | 196 |
| Phthalic acid anhydride | | | | | 296 |
| Ethylene glycol | 182 | 161 | 174 | 124 | 124 |
| Propane diol-1,2 | | | 91 | 173 | 173 |
| Trimethylol-propane-diallyl ether | 514 | 769 | 214 | 171 | 171 |
| Hydroquinone | 0.204 | 0.25 | 0.16 | 0.158 | 0.17 |
| Characteristic values of PE: | | | | | |
| Acid number | 30 | 25 | 30 | 30 | 30 |
| Hydroxyl number | 55 | 70 | 86 | 85 | 68 |
| Viscosity [1] (sec.) | 16 | 15 | 20 | 18 | 17 |
| G.-mole allyl ether radicals per 100 grams | 0.47 | 0.58 | 0.27 | 0.20 | 0.18 |
| G.-mole ethylene-dicarboxylic acid radicals per 100 grams | 0.39 | 0.32 | 0.5 | 0.51 | 0.22 |

[1] Viscosity measured according to 4 DIN 53,211, 50% solution in styrene.

The characteristic values of the cellulose acetobutyrates (CAB) used in the following are summarized in Table II.

TABLE II.—Viscosity according to ASTM–D–8 71–56
[Formula B]

| CAB | Second | |
|---|---|---|
| 3 | 0.1 | Content of acetic acid: 17–21% by weight. |
| 4 | 0.2 | Content of butyric acid: 45–50% by weight. |
| 5 | 0.5 | Hydroxyl content: 0–2% by weight. |
| 7 | 3.0 | |
| 9 | 20.0 | |

The varnish solutions are prepared as follows:

The cellulose acetobutyrate stated in Table II is dissolved in the solvent, while heating to about 40 to 80° C., and the polyester stated in Table I is then added.

With these solutions there are prepared:

A-films in the following manner: 2.5 g. of a 60% solution are diluted with 7.5 g. of a mixture of toluene and ethyl acetate (2:1). These solutions are mixed with 3 percent by weight of 50 percent by weight cyclohexanone hydroperoxide and with 1 percent by weight of a 20% cobalt naphthenate solution (2:2 percent by weight cobalt) in toluene and poured on to glass plates so that dry films of about 40μ thickness are obtained.

B-films in the following manner: 8.35 g. of the 60% solution are diluted with 1.65 g. styrene. The solutions are mixed with 4 percent by weight of a 50 percent by weight cyclohexanone hydroperoxide and with 1 percent by weight of the cobalt naphthenate solution described above. Layers of 300μ thickness are applied to glass plates by means of a film extruder, and these yield dry films of about 100μ thickness. The temperature during the drying of the film amounts to 22° C.

The composition and viscosity of the varnish solutions and the dust-drying time of the films are assembled in the following Table III.

TABLE III

| | | Percent by weight solvent | | | Viscosity in (cp.) | Dust-drying time, min. | | Stability to solvents after days— |
|---|---|---|---|---|---|---|---|---|
| | CAB | PE 1 | Styrene | Isopropanol | | A-films (40μ) | B-films (100μ) | |
| Control | | 60 | 30 | 10 | 90 | 70 | 120 | 1 |
| Example: | | | | | | | | |
| 1 | 6 CAB 5 | 54 | 30 | 10 | 1,650 | 40 | 60 | 1 |
| 2 | 10 CAB 5 | 50 | 30 | 10 | 5,350 | 25 | 40 | 1 |
| 3 | 20 CAB 5 | 40 | 30 | 10 | 65,000 | 20 | 30 | 7 |
| 4 | 30 CAB 5 | 30 | 30 | 10 | >100,000 | 15 | 25 | 14 |
| 5 | 10 CAB 3 | 50 | 30 | 10 | 1,360 | 40 | 60 | 1 |
| 6 | 10 CAB 4 | 50 | 30 | 10 | 2,510 | 35 | 55 | 1 |
| 2 | 10 CAB 5 | 50 | 30 | 10 | 5,350 | 25 | 40 | 1 |
| 7 | 10 CAB 7 | 50 | 30 | 10 | 16,000 | 20 | 40 | 1 |
| 8 | 10 CAB 9 | 50 | 30 | 10 | 80,000 | 15 | 35 | 1 |
| 9 | {2 CAB 9, 8 CAB 3} | 50 | 30 | 10 | 6,600 | 25 | 45 | 1 |
| 10 | 5 CAB 9 | 55 | 30 | 10 | 8,700 | 25 | 50 | 1 |
| 11 | 20 CAB 3 | 40 | 30 | 10 | 5,700 | 25 | 40 | 6 |

All the films listed in the table are stable to cyclohexanone, ethyl alcohol (96%) and benzene after the stated periods of time.

If in the examples of Table III the styrene is replaced with toluene to form styrene-free films, then the dust-drying time can be reduced by 1 to 5 minutes; also the surfaces of these films are stable to solvents.

If in Example 2 of Table III the polyester PE 1 is replaced with the polyesters PE 2 to PE 4 indicated in Table I, then these solutions yield films which have virtually the same dust-drying times as those of Example 2 of Table III and are likewise stable to solvents. If the polyester PE 5 is used in Example 2 of Table III, the film is no longer stable to solvents, since the content of ethylene-dicarboxylic acid per 100 g. of polyester+allyl ether compound+cellulose ester is below the stated critical value.

If in Example 2 of Table III there are prepared A-films in which the peroxide is omitted, i.e. which are dried only with cobalt naphthenate, then the following drying characteristics and film properties are obtained.

| Siccativation | Dust-drying time, minutes | Final dryness, hours | Stability solvents after days— |
|---|---|---|---|
| Co plus peroxide | 22 | 3 | 1 |
| Co | 20 | 8 | 3 |

We claim:
1. A varnish consisting essentially of a solvent solution containing a polycondensation product of an α,β-ethylenically unsaturated dicarboxylic acid and a polyhydric alcohol, an allyl ether compound, and a cellulose ester or a cellulose mixed ester, said cellulose ester having at least 50% of its esterifiable hydroxyl groups esterified with an aliphatic carboxylic acid containing at least three carbon atoms and said cellulose mixed ester having at least 40% of its esterifiable hydroxyl groups esterified with an aliphatic carboxylic acid containing at least three carbon atoms and at least 10% of said hydroxyl groups esterified with acetic acid, there being at least 0.2 g. mol of α,β-ethylenically unsaturated dicarboxylic acid ester radicals and at least 0.1 g. mole of allyl ether radicals per 100 g. of said polycondensation product, said allyl ether compound and said cellulose ester or mixed ester and there being from about 9 to about 100% by weight of said cellulose ester or mixed cellulose ester based on the total weight of said polycondensation product and said allyl ether compound.

2. The varnish of claim 1 wherein the allyl ether is chemically incorporated in the unsaturated polyester.

3. The varnish of claim 1 wherein the allyl ether is present as a mixed component.

4. The varnish of claim 1 wherein the allyl ether is a diallyl ether of a trihydric alcohol.

5. The varnish of claim 1 wherein the unsaturated polyester is a maleic acid or a fumaric acid polyester.

6. The varnish of claim 1 wherein the polyester has an acid number below about 30.

7. The varnish of claim 1 wherein the unsaturated polyester has an hydroxyl number between about 45 and about 80.

8. The varnish of claim 1 wherein the content of the cellulose ester is from about 15 to about 50% by weight.

9. The varnish of claim 1 wherein the solvent is an inert solvent.

10. The varnish of claim 9 wherein the solvent is an aromatic hydrocarbon, ester or ether.

11. The varnish of claim 1 wherein the solevnt is a copolymerizable vinyl compound selected from the group consisting of styrene, divinylbenzene, acrylic acid ester, methacrylic acid ester, crotonic acid ester, acrylic acid amide, methacrylic acid amide, crotonic acid amide, vinyl alcohol ester, allyl alcohol ester and vinyl ketone.

12. The varnish of claim 11 wherein the solvent is styrene.

13. The varnish of claim 1 containing a soluble metal compound as siccative.

14. The varnish of claim 1 containing a peroxide catalyst.

References Cited

Chem. Abstract, vol. 60: 766b (1964), Jenkins et al., "Unsaturated Polyester Coating Compositions."

Chem. Abstract, vol. 66: 105986s (1967), O'Neill et al., "Coating Compositions Based on Alkyd Resins."

Chem. Abstract, vol. 66: 19949a (1967), Baticle, "Use of Cell. Acet. Buty. . . . Polyesters."

WILLIAM H. SHORT, Primary Examiner

E. WOODBERRY, Assistant Examiner

U.S. Cl. X.R.

260—873